US008809410B2

(12) United States Patent
Macken et al.

(10) Patent No.: US 8,809,410 B2
(45) Date of Patent: Aug. 19, 2014

(54) PROCESS FOR MAKING A FLEXIBLE POLYURETHANE FOAM

(75) Inventors: Johan Antoine Stefaan Macken, Tildonk (BE); Herman Eugene Germain Moureau, Tienen (BE); Steven Ramsdonck, Genk (BE); Annelies Vandevelde, Gingelom (BE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/500,211

(22) PCT Filed: Sep. 14, 2010

(86) PCT No.: PCT/EP2010/063467
§ 371 (c)(1),
(2), (4) Date: Apr. 4, 2012

(87) PCT Pub. No.: WO2011/042284
PCT Pub. Date: Apr. 14, 2011

(65) Prior Publication Data
US 2012/0196946 A1    Aug. 2, 2012

(30) Foreign Application Priority Data
Oct. 7, 2009  (EP) .................................. 09172422

(51) Int. Cl.
*C08G 18/00*    (2006.01)
*C08G 18/48*    (2006.01)
*A01G 31/00*    (2006.01)
*A01G 9/10*    (2006.01)
*C08G 18/10*    (2006.01)
*C08G 101/00*    (2006.01)

(52) U.S. Cl.
CPC .......... *C08G 18/485* (2013.01); *C08G 18/4841* (2013.01); *C08G 2101/0058* (2013.01); *C08G 2101/0083* (2013.01); *A01G 31/001* (2013.01); *C08G 2101/0075* (2013.01); *C08G 2101/005* (2013.01); *A01G 9/1086* (2013.01); *C08G 2101/0008* (2013.01); *C08G 18/10* (2013.01)
USPC ............................ 521/159; 521/170; 521/174

(58) Field of Classification Search
USPC .......................................... 521/159, 170, 174
See application file for complete search history.

(56) References Cited

U.S. PATENT DOCUMENTS

| | | | |
|---|---|---|---|
| 3,798,836 A | 3/1974 | Rubens et al. | |
| 3,838,075 A | 9/1974 | Dietrich et al. | |
| 3,889,417 A | 6/1975 | Wood et al. | |
| 3,970,618 A | 7/1976 | Jabs et al. | |
| 4,365,025 A | 12/1982 | Murch et al. | |
| 4,833,176 A | 5/1989 | Wolf et al. | |
| 4,839,397 A | 6/1989 | Lohmar et al. | |
| 4,910,231 A | 3/1990 | Pham et al. | |
| 4,916,168 A | 4/1990 | Pham et al. | |
| 5,043,360 A | 8/1991 | Pham et al. | |
| 5,114,989 A * | 5/1992 | Elwell et al. | 521/159 |
| 5,155,931 A | 10/1992 | Vansteenkiste et al. | |
| 5,436,277 A * | 7/1995 | Narayan et al. | 521/160 |
| 5,459,170 A | 10/1995 | Bleys et al. | |
| 5,459,221 A * | 10/1995 | Narayan et al. | 528/67 |
| 5,510,053 A * | 4/1996 | Narayan et al. | 252/182.2 |
| 5,521,225 A * | 5/1996 | Gerber et al. | 521/155 |
| 5,521,226 A | 5/1996 | Bleys | |
| 5,621,016 A * | 4/1997 | Murty et al. | 521/159 |
| 5,900,441 A * | 5/1999 | De Witte et al. | 521/159 |
| 6,133,481 A * | 10/2000 | Singh et al. | 568/25 |
| 6,271,277 B1 * | 8/2001 | Bleys et al. | 521/137 |
| 6,417,241 B1 | 7/2002 | Huygens et al. | |
| 6,479,433 B1 | 11/2002 | Hann et al. | |
| 6,495,652 B1 * | 12/2002 | Reichelt et al. | 528/59 |
| 6,590,005 B2 * | 7/2003 | Singh et al. | 521/131 |
| 6,919,384 B2 * | 7/2005 | Yu | 521/159 |
| 7,022,746 B2 | 4/2006 | Lockwood et al. | |
| 2003/0087979 A1 * | 5/2003 | Bleys et al. | 521/155 |
| 2005/0131095 A1 | 6/2005 | Yu et al. | |
| 2005/0176840 A1 * | 8/2005 | Chan et al. | 521/159 |
| 2009/0118386 A1 | 5/2009 | Berthels et al. | |

FOREIGN PATENT DOCUMENTS

| | | |
|---|---|---|
| DE | 3 710 731 | 4/1989 |
| EP | 0 309 217 | 3/1989 |
| EP | 0 309 218 | 3/1989 |
| EP | 0 365 096 | 4/1990 |
| EP | 1 192 852 | 4/2002 |
| WO | WO 96/16099 | 5/1996 |
| WO | WO 00/08083 A | 2/2000 |
| WO | WO 2007/110286 A | 10/2007 |

* cited by examiner

Primary Examiner — Melissa Rioja
(74) Attorney, Agent, or Firm — Robert A. Diaz

(57) ABSTRACT

Flexible polyurethane foam having a density of 25-70 kg/m$^3$ and a compression load deflection of 5-15 kPa. Process for making a flexible polyurethane foam and the use as plant growth medium and in green roofs and green walls.

7 Claims, No Drawings

US 8,809,410 B2

PROCESS FOR MAKING A FLEXIBLE POLYURETHANE FOAM

CROSS-REFERENCE TO RELATED APPLICATIONS

This application is the National Phase of International Application PCT/EP2010/063467 filed Sep. 14, 2010 which designated the U.S. and which claims priority to European App. Serial No. 09172422.9 filed Oct. 7, 2009. The noted applications are incorporated herein by reference.

The present invention relates to a flexible polyurethane foam and to a process for making a flexible polyurethane foam, to a plant growth medium comprising such a foam and to the use of such a foam as plant growth medium.

Plant growth media comprising flexible polyurethane foams are known.

U.S. Pat. No. 3,798,836 discloses a water insoluble open celled foamed polyurethane matrix having dispersed therein thermoplastic particles.

U.S. Pat. No. 3,889,417 makes a hydrophilic foam by reacting a prepolymer with a high amount of water. This foam may be used in horticultural applications. The water index applied is 1300-78000. A similar process has been disclosed in WO 96/16099 wherein no special guidance as to the isocyanate index and the water index has been given; in the examples the water index was more than 1700 and the isocyanate index was less than 6. The prepolymers used are made from polyols having a molecular weight of at least 1000.

U.S. Pat. No. 3,970,618 discloses a substrate for cultivating plants which substrate is a hydrophilic polyurethane foam made by reacting a polyisocyanate and a polyol at a low NCO index, the polyol having an hydroxyl value of 900-1800 and the polyisocyanate being a toluene diisocyanate (TDI) type polyisocyanate.

U.S. Pat. No. 5,155,931 uses a foam as plant mat, which foam is made by reacting an organic isocyanate, which preferably is TDI, and a polyol at an NCO-index of 90-120.

U.S. Pat. No. 6,479,433 discloses a horticultural growing medium made by reacting a prepolymer and water in the presence of a selected filler material.

US 2005/0131095 discloses a process for making polyurethane foams, including flexible ones, at an NCO-index of 40-150. No special attention has been given to the water index; in the examples the NCO-index was between 85-106 and the water index varied between 93-120.

A process for making flexible polyurethane foams at a low isocyanate index using a low and a high amount of water has been described in EP 309217 and EP 309218, respectively.

Surprisingly, polyurethane foams could be further improved in particular regarding the foam stability at 100% water saturation and the water buffer capacity together with a high compression load deflection at low density.

Surprisingly we also have found a novel process to make such novel polyurethane foams.

Therefore the present invention is concerned with a flexible polyurethane foam having a density of 25-70 kg/m³, a compression load deflection at 40% (CLD) of 5-15 kPa, a volume increase at water saturation of at most 25% and a water buffer capacity of 40-60%.

Further the present invention is concerned with a process for making such a flexible polyurethane foam, which process comprises reacting at an isocyanate index of 20-70 and at a water index of 200-400 a polyisocyanate prepolymer having an NCO-value of 20-30% by weight and made by reacting a polyisocyanate comprising 30-80% by weight of diphenylmethane diisocyanate (MDI) and 20-70% by weight of homologues of this diisocyanate, the homologues having an isocyanate functionality of 3 or more, the amounts both calculated on the amount of polyisocyanate, and a polyol having an average molecular weight of 62-1000 and an average nominal hydroxyl functionality of 2-4, a polyoxyethylene polyoxypropylene polyol or a mixture of such polyols, the polyol or the mixture having an average nominal hydroxyl functionality of 2-4, an average molecular weight of 2000-8000 and an average oxyethylene content of 25-50% by weight, calculated on the weight of this polyol or mixture respectively, water, and optionally isocyanate-reactive chain extenders and/or cross-linkers having an average molecular weight of 60-1999, and optionally in the presence of auxiliaries and additives used in the polyurethanes art.

Preferably the foams have a density of 26-60 kg/m³ and a compression load deflection at 40% (CLD) of 5-12 kPa. More preferably the foams additionally have a volume increase at water saturation of at most 15%.

Still further the present invention is concerned with plant growth media comprising a flexible polyurethane foam according to the present invention.

Finally, the present invention is concerned with the use of a flexible polyurethane foam according to the present invention as plant growth medium and in green walls and/or green roofs.

Processes for making polyurethane foams using polyols having a relatively high oxyethylene content at a low isocyanate index have been disclosed in DE 3710731, U.S. Pat. No. 4,833,176, U.S. Pat. No. 4,365,025, U.S. Pat. No. 4,910,231, U.S. Pat. No. 5,459,170, U.S. Pat. No. 5,521,226, U.S. Pat. No. 6,417,241, U.S. Pat. No. 7,022,746 and WO 2007/110286.

However the foams and the processes according to the present invention have not been disclosed. The foams are very suitable for use as plant growth medium since they have good wetting, wicking, water retention and water release properties while retaining good physical properties, like compression hardness and compression deformation resistance, under dry as well as wet circumstances.

The foams according to the present invention are also superior in at least one of the above properties with respect to other materials which have been proposed in the past as plant growth supporting material like perlite, gravel, mineral wool, wood fibres, coir, peat and polystyrene foam beads.

A preferred process is a process according to the present invention wherein the polyether polyol used in making the prepolymer comprises oxyethylene groups in an amount of at least 50% by weight calculated on the weight of this polyol, this polyol having an average molecular weight of 250-800. Most preferably this polyether polyol is a polyoxyethylene triol, having an average molecular weight of 250-800.

In the context of the present application the following terms have the following meaning:

1) isocyanate index or NCO index or index:

the ratio of NCO-groups over isocyanate-reactive hydrogen atoms present in a formulation, given as a percentage:

$$\frac{[NCO] \times 100}{[active\ hydrogen]} (\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients used in that reaction step. Only the free isocyanate groups and the free isocyanate-reactive hydrogens (including those of the water) present at the actual foaming stage are taken into account.

Water index is the ratio 100Y/X (%) wherein Y is the amount of water in grams actually used in a formulation and X is the total amount of water in grams theoretically needed in the same formulation so as to obtain an isocyanate index of 100.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water. This means that for the purpose of calculating the isocyanate index at the actual foaming process one hydroxyl group is considered to comprise one reactive hydrogen and one water molecule is considered to comprise two active hydrogens.

3) The expression "polyurethane foams" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-polyurethane foams).

4) The term "nominal hydroxyl functionality" or "nominal functionality" or "hydroxyl functionality" is used herein to indicate the functionality (number of hydroxyl groups per molecule) of the polyol composition on the assumption that this is the functionality (number of active hydrogen atoms per molecule) of the initiator(s) used in their preparation although in practice it will often be somewhat less because of some terminal unsaturation. The term "equivalent weight" refers to the molecular weight per isocyanate reactive hydrogen atom in the molecule.

5) The word "average" refers to "number average".

6) The wording "one shot" refers to a way of reacting the ingredients to prepare the foam wherein all polyols having an average molecular weight of more than 1000 are reacted with polyisocyanate in the presence of water.

7) Density: density measured according to ISO 845.

8) Hardness CLD: compression load deflection at 40% measured according to ISO 3386/1 with the proviso that the hardness is measured during the first cycle.

9) Foam stability $\Delta V$ is the volume increase at 100% water saturation, in %:

$$\Delta V = \frac{V_1 - V_2}{V_2} \times 100\%,$$

wherein $V_2$ is the volume of the foam without water intake and $V_1$ is the volume of the foam at maximal water absorption both at 23° C. and 50% relative humidity. In order to determine $V_1$, the foam is immersed in water for 24 h at ambient pressure and 23° C.

10) Water buffer capacity (WBC, %) is $\phi_0 - \phi_{32}$, wherein $$\Phi_0 = \frac{V_u}{V_f} \times 100(\%) \text{ and}$$

$$\Phi_{32} = \frac{V_r}{V_f} \times 100(\%),$$

wherein
$V_f$ is the volume of the foam sample in ml, $V_u$ is the water uptake of this foam sample in ml when immersed in water for 24 h and $V_r$ is the volume (in ml) of the water retained after this foam sample containing the water has been subjected to a pressure of −32 cm $H_2O$ column for 24 h.

$V_f$, $V_u$ and $V_r$ are determined as follows: A foam sample is cut to obtain dimensions 100×120×75 mm (length× width×height). Hence $V_f$ of the sample is 900 ml. The dry weight of the foam sample is determined at 105° C. Then the foam sample is immersed for 6 hours at atmospheric pressure and 23° C. in a water bath in such a way that 1 cm of the sample in the height direction extends above the water surface.

Then the sample is immersed completely for 18 hours at atmospheric pressure and 23° C. Subsequently the sample is placed on a sieve with a mesh of 0.5-1 cm at the same pressure and temperature and allowed to release water for 30 minutes. Finally the weight of the foam sample (containing the remaining water) is determined again and $V_u$ is calculated, assuming a density of the $H_2O$ of 1 kg/dm$^3$.

Then the sample (with the water) is placed for 24 h in a closed environment at 23° C. and a sub-atmospheric pressure is applied on the bottom surface of the sample. The pressure is −32 cm $H_2O$ from the middle of the sample.

Finally the weight of the sample is determined again and the volume $V_r$ of water retained in the sample is calculated (assuming a water density of 1 kg/dm$^3$).

A device which may be used to create a sub-atmospheric environment on the bottom surface of the sample is a so-called Sandbox obtainable from the Dutch firm Eijkelkamp (www.eijkelkamp.com) and used for pF-determinations.

The WBC of the foam should be 40-60% and $\phi_0$ preferably 60-80 and most preferably 65-75%.

The polyisocyanates used to make the polyisocyanate prepolymer are known in the art. They are widely called polymeric or crude MDI and mixtures of polymeric or crude MDI and MDI.

Polymeric or crude MDI comprise MDI and homologues having an isocyanate functionality of 3 or more and are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the average isocyanate functionality preferably ranges from 2.3-2.8. The NCO value of these polymeric or crude MDIs is at least 30% by weight. The polymeric or crude MDI contain diphenylmethane diisocyanate, the remainder being polymethylene polyphenylene polyisocyanates of functionality greater than two. If desired this polymeric or crude MDI may be mixed with MDI provided the polyisocyanate has the required amount of diisocyanates and homologues having an isocyanate functionality of 3 or more. For example such polyisocyanates may be made by mixing in appropriate relative amounts SUPRASEC® MI 20 (obtainable ex Huntsman), containing about 80 parts by weight of 4,4'-MDI and about 20 parts by weight of 2,4'-MDI and less than 2 parts by weight of 2,2'-MDI and SUPRASEC® 2185 (ex Huntsman), a polymeric MDI having an NCO value of 30.7% by weight; comprising about 38% by weight of diisocyanate, the remainder being homologues having an isocyanate functionality of 3 or more; about 6% by weight of the diisocyanates being 2,4'-MDI and less than 1% by weight of the diisocyanates being 2,2'-MDI. Mixtures of Suprasec 2185 and Suprasec MPR (4,4'-diphenylmethane diisocyanate, also ex Huntsman) may also be used.

The polyisocyanate comprises 30-80 and preferably 50-70% by weight of MDI and 20-70 and preferably 30-50% by weight of homologues of MDI, the homologues having an isocyanate functionality of 3 or more, wherein both amounts are calculated on the amount of polyisocyanate.

Polyols, having an average molecular weight of 62-1000 and an average nominal hydroxyl functionality of 2-4, which may be used in making the polyisocyanate prepolymer include ethylene glycol, diethylene glycol, triethylene glycol, propylene glycol, dipropylene glycol, tripropylene glycol, butanediol, glycerol, triethanolamine, trimethylolpropane, 1,2,6-hexanetriol, pentaerythritol, polyoxyethylene polyols, polyoxypropylene polyols, polyoxyethylene polyoxypropylene polyols and mixtures thereof.

Preferred are polyols obtained by the polymerisation of ethylene oxide and optionally propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexane-dimethanol, glycerol, trimethylolpropane, 1,2,6-hexanetriol and pentaerythritol. Mixtures of initiators and/or cyclic oxides may be used. The polyoxyethylene-polyoxypropylene polyols are obtained by the simultaneous or sequential addition of ethylene and propylene oxides to initiators as fully described in the prior art. Random copolymers, block copolymers and combinations thereof may be used. Preferred ones are those having at least part and preferably all of the oxyethylene groups at the end of the polymer chain (capped or tipped). Mixtures of the said polyols may be used as well.

Most preferred are polyoxyethylene polyols and polyoxyethylene polyoxypropylene polyols having an average nominal hydroxyl functionality of 2-4 and most preferably of 3, an average molecular weight of 250-800 and an oxyethylene content of at least 50% by weight, calculated on the weight of the polyol. Such polyols are commercially available. An example is Polyol 3380 ex Perstorp.

The polyisocyanate prepolymers are made in known manner by combining and mixing the polyisocyanate and the polyol in such relative amounts that a prepolymer is obtained having an NCO-value of 20-30% by weight and allowing them to react. If desired a catalyst may be used which enhances the formation of urethane groups.

Polyols which may be used in making the flexible foam according to the present invention and which are to react with the polyisocyanate prepolymer include products obtained by the polymerisation of ethylene oxide and propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexane dimethanol, glycerol, trimethylolpropane, 1,2,6-hexanetriol and pentaerythritol. Mixtures of initiators may be used as well. The polyoxyethylene-polyoxypropylene polyols are obtained by the simultaneous or sequential addition of ethylene and propylene oxides to initiators as fully described in the prior art. Random copolymers, block copolymers and combinations thereof may be used having the indicated amount of oxyethylene groups.

Mixtures of polyols may be used as well. When mixtures of polyols are used the mixture should have an average nominal hydroxyl functionality of 2-4, an average molecular weight of 2000-8000 and an average oxyethylene content of 25-50% by weight, calculated on the weight of the mixture of polyols. The polyols constituting the mixture also have a nominal hydroxyl functionality of 2-4 and a molecular weight of 2000-8000. The individual polyols constituting the mixture may have an oxyethylene content of 20-90% by weight, calculated of the weight of the polyol concerned, provided the mixture has an average oxyethylene content of 25-50% by weight, calculated on the weight of this mixture.

Such polyols are known and commercially available. Examples are Daltocel® F489 and Daltocel® F442. An example of such a mixture is a mixture of Daltocel® F489 polyol and Daltocel® F442 polyol in a weight ratio of 4:1. Both polyols have a nominal hydroxyl functionality of 3 and an average molecular weight between 2000 and 8000. Their oxyethylene contents are about 27 and 76% by weight respectively, calculated on the weight of the polyol. Daltocel F489 and F442 are both obtainable from Huntsman. Daltocel is a trademark of the Huntsman Corporation or an Affiliate thereof which has been registered in one or more but not all countries.

Water is used in such an amount that the isocyanate index is 20-70 and the water index is 200-400.

Further a catalyst may be used which enhances the formation of urethane groups. Preferably it is used in an amount of 0.1-2% by weight (on all isocyanate reactive ingredients). Such catalysts are generally known in the art. Examples are amine catalysts, like triethylenediamine, N,N-dimethylethanolamine, bis (N,N-dimethylaminoethyl)ether, 2-(2-dimethylaminoethoxy)-ethanol, N,N,N'-trimethyl-N'-hydroxyethylbisaminoethyl-ether, N-(3-dimethylaminopropyl)-N,N-diisopropanolamine, N,N'-diethylpiperazine and 1-(bis(3-dimethyl-aminopropyl)amino-2-propanol and organometallic compounds like stannous octoate and dibutyltin dilaurate. Mixtures of catalysts may be used as well.

Optionally the foams may be made in the presence of additives and auxiliaries used in the polyurethanes art, like fire retardants, surfactants, other blowing agents, smoke-surpressants, colouring agents, carbon black, anti-microbial agents, anti-oxidants, mould release agents, fillers and fertilizers.

The foams are made by combining and mixing all ingredients and allowing the reaction to take place. The foams may be made according to a free rise process, a moulding process, a slabstock process, a lamination process or a spray process.

Irrespective of the type of process, the foams are made in such a way that the rise of the foam is not restricted or restricted in a limited way to such an extent that the density of the foam is at most 20% and preferably at most 10% higher than the free rise density of this foam. A "free rise" foam is a foam which has been made by allowing the ingredients for making the foam to react and by allowing the reacting and foaming material to expand freely in vertical direction. When "restricted free rise" is employed, means are used in order to make foams with a more rectangular shape and in order to avoid the formation of an uneven upper surface. This reduces the amount of foam waste. Several ways exist to achieve this more rectangular shape. Examples known in the art are the use of a so-called floating lid, the Draka/Petzetakis process, the Maxfoam process, the Panibloc process, the Quadrofoam process and the Vertifoam process. When "restricted free rise" is employed, it is to be understood in the context of the present application that the restriction applied is of such a nature that the density increase is as limited as possible and as indicated above. All densities are measured according to ISO845.

The ingredients may be fed independently to the mixing head of a foaming machine. Preferably the isocyanate reactive ingredients are premixed, optionally together with the additives and auxiliaries used in the polyurethanes art, before they are mixed with the polyisocyanate.

The foams obtained have a density of 25-70 and preferably of 26-60 kg/m$^3$. The foams have a level of air flow and cell openness which makes them suitable for use as plant growth medium, in particular for growing vegetables and flowers and for use in green walls and/or green roofs and other applications related to water economy management for plants.

The invention is illustrated with the following examples.

EXAMPLES 1-5

Flexible foams were made by allowing the following formulations to react under free rise conditions. The foams were subjected to physical tests in order to determine the density, the hardness (CLD), the foam stability $\Delta V$, the WBC and $\phi_0$.

The formulations and the physical properties were as follows. Amounts are in parts by weight (pbw). Example 1 is a comparative example.

| Example | 1 | 2 | 3 | 4 | 5 |
|---|---|---|---|---|---|
| Polyisocyanate 1 | 35.1 | — | — | — | — |
| Polyisocyanate 2 | — | 36.2 | 38.2 | — | — |
| Polyisocyanate 3 | — | — | — | 36.6 | 36.5 |
| Polyol 1 | 58 | 11.6 | 11.1 | 11.6 | 11.5 |
| Polyol 2 | — | 46.4 | 44.6 | 46.2 | 46.1 |
| Polyol 3 | 1.8 | — | — | — | — |
| Catalyst 1 | — | 0.6 | 0.6 | 0.6 | 0.6 |
| Catalyst 2 | 0.5 | 0.05 | 0.05 | 0.05 | 0.05 |
| Catalyst 3 | 0.5 | — | — | — | — |
| Surfactant 1 | — | 0.25 | 0.25 | 0.25 | 0.25 |
| Surfactant 2 | 0.3 | — | — | — | — |
| Water | 3.8 | 4.9 | 5.2 | 4.7 | 5.0 |
| Isocyanate index | 54 | 40 | 40 | 40 | 38 |
| Water index | 200 | 280 | 280 | 280 | 300 |
| Density, kg/m$^3$ | 26 | 35 | 30 | 37 | 36 |

-continued

| Example | 1 | 2 | 3 | 4 | 5 |
|---|---|---|---|---|---|
| CLD-40 %, kPa | 2.2 | 10.7 | 11.3 | 7.0 | 7.0 |
| $\Delta V$, % | 65 | 15 | 11 | 19 | 22 |
| WBC, % | 60 | 48 | 55 | 48 | 53 |
| $\phi_0$, % | 91 | 73 | 75 | 69 | 73 |

Polyisocyanate 1 is a mixture of 47.6 pbw of Suprasec 2020, 10.4 pbw of Suprasec 2185 and 47.6 pbw of Suprasec MPR; all these polyisocyanates are obtainable ex Huntsman. Polyisocyanate 2 is a prepolymer obtained by reacting 93 pbw of Suprasec 2185 and 7 pbw of Jeffox WL-440 (a polyoxyethylenetriol ex Huntsman having an OH value of 344 mg KOH/g) and having an NCO value of about 26.7% w.

Polyisocyanate 3 is a prepolymer obtained by reacting 54 pbw of Suprasec 2185 and 36 pbw Suprasec MPR and 10 pbw of Polyol 3380 (a polyoxyethylene triol ex Perstorp having an OH value of 382 mg KOH/g) and having an NCO value of about 25.9% w.

Polyol 1: Daltocel F442, a polyether polyol ex Huntsman having a nominal functionality of 3, an OH value of about 42 mg KOH/g and comprising oxyethylene and oxypropylene groups, the amount of oxyethylene groups being about 76% by weight (on polyol).

Polyol 2: Daltocel 489, a polyether polyol ex Huntsman having a nominal functionality of 3, an OH value of about 28 mg KOHg and comprising oxyethylene and oxypropylene groups, the amount of oxyethylene groups being about 27.5% by weight (on polyol).

Polyol 3: Jeffox WL 660, a polyoxyethylene monol having an OH value of about 31 mg KOH/g.

Catalyst 1: Jeffcat DPA ex Huntsman
Catalyst 2: Jeffcat ZF-10, ex Huntsman.
Catalyst 3: Jeffcat Z130, ex Huntsman.
Surfactant 1: Tegostab B8724LF, ex Evonik
Surfactant 2: Dabco DC2525, ex Air Products Suprasec, Daltocel, Jeffcat and Jeffox are trademarks of the Huntsman Corporation or an Affiliate thereof which have been registered in one or more but not all countries.

Further Comparative Examples

1) Example 2 has been repeated at the same isocyanate index and water index with Suprasec 2591 polyisocyanate instead of Polyisocyanate 2. The foam obtained had a CLD-40% of 1.8 only. Suprasec 2591 is a prepolymer made from a polyol having a molecular weight of about 6000 and was used in comparative experiment 1 of example 7 of US 2005/0131095.

2) Example 2 has been repeated at the same isocyanate index and water index with Suprasec 1002 polyisocyanate instead of Polyisocyanate 2. The foam collapsed. Suprasec 1002 is similar to the prepolymer used in experiment 5, example 1 of WO 96/16099.

3) Example 4 (above) was repeated with isocyanate index and water index both being 100. The foam showed inferior wicking properties and the water buffer capacity was 26% only. The wicking performance was tested by allowing the foam sample (l×w×h=2×2×7.5 cm) to float on water and to monitor the time to sink to the bottom in a glass bottle of 75 ml filled with water to 2.5 cm from the bottom. This comparative sample did not sink at all while the foam of example 4 sank within 20 seconds.

4) Example 1, experiment 5 of WO 96/16099 was repeated. The foam was totally closed and useless. Repeating the experiment with 70 pbw of water gave a foam with a density of 86 kg/m³ (dry) and a volume increase at saturation of 106% (the water index was about 4000).

The invention claimed is:

1. A flexible polyurethane foam having a density of 25-70 kg/m³, a compression load deflection at 40% (CLD) of 5-15 kPa, a volume increase at water saturation of at most 25%, and a water buffer capacity of 40-60% obtained by reacting at an isocyanate index of 20-70 and at a water index of 200-400 the following compounds a polyisocyanate prepolymer having an isocyanate-value of 20-30% by weight and made by reacting a polyisocyanate comprising 30-80% by weight of diphenylmethane diisocyanate and 20-70% by weight of homologues of diphenylmethane diisocyanate the homologues having an isocyanate functionality of 3 or more, the amounts both calculated on the amount of polyisocyanate, and a polyol used to form the prepolymer having oxyethylene groups in an amount of at least 50% by weight, calculated on the weight of the polyol used to form the prepolymer, wherein the polyol has an average molecular weight of 250-800;

a polyoxyethylene polyoxypropylene polyol or a mixture of polyoxyethylene polyoxypropylene polyols, said polyoxyethylene polyoxypropylene polyol or said mixture of polyoxyethylene polyoxypropylene polyols having an average nominal hydroxyl functionality of 2-4, an average molecular weight of 2000-8000 and an average oxyethylene content of 25-50% by weight, calculated on the weight of said polyoxyethylene polyoxypropylene polyol or said mixture of polyoxyethylene polyoxypropylene polyols respectively;

water;

optionally, isocyanate-reactive chain extenders having an average molecular weight of 60-1999;

optionally, isocyanate-reactive cross-linkers having an average molecular weight of 60-1999 and;

optionally, in the presence of auxiliaries and additives.

2. The foam according to claim 1 wherein the density is 26-60 kg/m³, the CLD is 5-12 kPa and the volume increase at water saturation is at most 15%.

3. A process for making a flexible polyurethane foam having a density of 25-70 kg/m³, a compression load deflection at 40% (CLD) of 5-15 kPa, a volume increase at water saturation of at most 25%, and a water buffer capacity of 40-60% the method comprising reacting at an isocyanate index of 20-70 and at a water index of 200-400 a polyisocyanate prepolymer having an isocyanate-value of 20-30% by weight and made by reacting a polyisocyanate comprising 30-80% by weight of diphenylmethane diisocyanate and 20-70% by weight of homologues of diphenylmethane diisocyanate the homologues having an isocyanate functionality of 3 or more, the amounts both calculated on the amount of polyisocyanate, and a polyol used to form the prepolymer having oxyethylene groups in an amount of at least 50% by weight, calculated on the weight of the polyol, wherein the polyol used to form the prepolymer has an average molecular weight of 250-800;

a polyoxyethylene polyoxypropylene polyol or a mixture of polyoxyethylene polyoxypropylene polyols, said polyoxyethylene polyoxypropylene polyol or said mixture of polyoxyethylene polyoxypropylene polyols having an average nominal hydroxyl functionality of 2-4, an average molecular weight of 2000-8000 and an average oxyethylene content of 25-50% by weight, calculated on the weight of said polyoxyethylene polyoxypropylene polyol or said mixture of polyoxyethylene polyoxypropylene polyols respectively;

water;

optionally isocyanate-reactive chain extenders having an average molecular weight of 60-1999;

optionally isocyanate-reactive cross-linkers having an average molecular weight of 60-1999; and optionally in the presence of auxiliaries and additives.

4. A process for making a flexible polyurethane foam according to claim 3 wherein the foam is made according to a free rise process or a restricted free rise process process.

5. A plant growth medium, green wall, or green roof comprising the flexible polyurethane foam according to claim 1.

6. The flexible polyurethane foam according to claim 1 wherein the polyol used to form the prepolymer has an average nominal hydroxyl functionality of 2-4.

7. The process according to claim 3 wherein the polyol used to form the prepolymer has an average nominal hydroxyl functionality of 2-4.

* * * * *